United States Patent
Lee et al.

(10) Patent No.: US 9,667,389 B2
(45) Date of Patent: May 30, 2017

(54) DEVICE AND METHOD FOR PROCESSING HARQ DATA SELECTIVELY USING INTERNAL AND EXTERNAL MEMORIES

(71) Applicants: Hae Chul Lee, Gyeonggi-do (KR); Chae Hag Yi, Gyeonggi-do (KR); Hyeong Seok Jeong, Gyeonggi-do (KR); Jun Ho Huh, Gyeonggi-do (KR)

(72) Inventors: Hae Chul Lee, Gyeonggi-do (KR); Chae Hag Yi, Gyeonggi-do (KR); Hyeong Seok Jeong, Gyeonggi-do (KR); Jun Ho Huh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 150 days.

(21) Appl. No.: 14/518,420

(22) Filed: Oct. 20, 2014

(65) Prior Publication Data
US 2015/0113360 A1    Apr. 23, 2015

(30) Foreign Application Priority Data
Oct. 22, 2013 (KR) .......... 10-2013-0125740

(51) Int. Cl.
*H04L 27/06* (2006.01)
*H04L 1/08* (2006.01)
(Continued)

(52) U.S. Cl.
CPC .......... *H04L 1/1864* (2013.01); *G06F 11/10* (2013.01); *H04L 1/1845* (2013.01)

(58) Field of Classification Search
CPC ... H04L 1/1845; H04L 1/1812; H04L 1/1864; H04L 1/20; H04L 27/38; H04L 1/0075;
(Continued)

(56) References Cited

U.S. PATENT DOCUMENTS 6,542,982 B2 * 4/2003 Murakami ............ G06F 9/3814
711/119
6,904,110 B2 * 6/2005 Trans ....................... H04B 1/00
375/229
(Continued)

FOREIGN PATENT DOCUMENTS

EP  2434407  3/2012
KR  1020080024419  3/2008
(Continued)

*Primary Examiner* — Phung M Chung
(74) *Attorney, Agent, or Firm* — The Farrell Law Firm, P.C.

(57) ABSTRACT

A device and method for selectively using an internal memory and an external memory when processing Hybrid Automatic Repeat reQuest (HARQ) data are provided. The device includes a combiner configured to receive a first HARQ burst; an internal memory positioned within the device; and a memory selector configured to compare a size of the first HARQ burst with a predetermined threshold, to select one of the internal memory and an external memory positioned outside the device according to a comparison result, and to store the first HARQ burst in a selected memory. At least one among a size of the internal memory and the threshold is determined based on a characteristic of a first service type that has been predetermined.

18 Claims, 11 Drawing Sheets

(51) Int. Cl.
  *H04L 27/38* (2006.01)
  *H04L 1/18* (2006.01)
  *G06F 11/10* (2006.01)

(58) Field of Classification Search
  CPC ... H04L 1/1874; H04L 1/1825; H04L 1/1893; H03M 13/6306; H03M 13/2957; G06F 11/10
  See application file for complete search history.

(56) References Cited

U.S. PATENT DOCUMENTS

| | | | | |
|---|---|---|---|---|
| 7,366,122 | B2* | 4/2008 | Lee | H04L 1/1812 370/310.1 |
| 7,433,817 | B2* | 10/2008 | Kjorling | G10L 21/038 704/200.1 |
| 7,589,789 | B2* | 9/2009 | Choi | H04N 5/4401 348/441 |
| 7,779,328 | B2* | 8/2010 | Kim | H03M 13/2975 375/295 |
| 8,161,342 | B2 | 4/2012 | Park et al. | |
| 8,175,015 | B1* | 5/2012 | Chowdhuri | G06F 9/461 370/300 |
| 8,897,293 | B1* | 11/2014 | Chowdhuri | G06F 9/461 370/300 |
| 9,001,936 | B2* | 4/2015 | Cho | H04L 1/0054 375/340 |
| 2003/0016770 | A1* | 1/2003 | Trans | H04B 1/00 375/346 |
| 2003/0186933 | A1* | 10/2003 | Yoo | A61K 9/0014 514/54 |
| 2007/0038922 | A1* | 2/2007 | Kim | H03M 13/2975 714/776 |
| 2009/0059801 | A1* | 3/2009 | Garrett | H04L 1/1835 370/242 |
| 2009/0086657 | A1* | 4/2009 | Alpert | H04L 1/1838 370/310 |
| 2010/0050034 | A1 | 2/2010 | Che et al. | |
| 2011/0066912 | A1 | 3/2011 | Riess et al. | |
| 2011/0231725 | A1* | 9/2011 | Gotman | H04L 1/1845 714/748 |
| 2015/0109996 | A1* | 4/2015 | Lee | H04L 1/1825 370/328 |

FOREIGN PATENT DOCUMENTS

| KR | 1020100009185 | 1/2010 |
|---|---|---|
| WO | WO 2012092717 | 7/2012 |

\* cited by examiner

FIG. 4

| MEMORY REGION ID | OB | HARQ ID |
|---|---|---|
| 1 | 1 | 0 |
| 2 | 1 | 0 |
| 3 | 1 | 0 |
| 4 | 0 | |
| 5 | 1 | 2 |
| 6 | 1 | 2 |
| 7 | 0 | |

DEVICE AND METHOD FOR PROCESSING HARQ DATA SELECTIVELY USING INTERNAL AND EXTERNAL MEMORIES

PRIORITY

This application claims priority under 35 U.S.C. §119(a) to Korean Patent Application No. 10-2013-0125740 filed in the Korean Intellectual Property Office on Oct. 22, 2013, the entire disclosure of which is incorporated herein by reference.

BACKGROUND

1. Field of the Invention

The present invention generally relates to a wireless communication device, and more particularly, to a device and method for receiving and processing a Hybrid Automatic Repeat reQuest (HARQ) signal in a wireless communication device.

2. Description of the Related Art

HARQ is a transmission method that improves a delay problem in an upper layer by adding channel coding, for utilizing an error packet, to existing Automatic Repeat reQuest (ARQ). HARQ is used in mobile communication standards such as High Speed Packet Access (HSPA) and Long Term Evolution (LTE). In a HARQ scheme, an error packet received in a previous process is stored in a form of a log likelihood ratio (LLR) signal. With the increase of transmission speed in mobile communication, the size of HARQ memory has increased.

A mobile communication terminal usually includes a HARQ signal processor to process HARQ burst data. The HARQ signal processor requires HARQ memory to store data for the processing of the HARQ burst data.

Generally, an internal memory within a modem of a terminal or an external memory outside the modem is used as HARQ memory. A technique of using both the internal memory and the external memory as a buffer of a HARQ data processor is disclosed in Korean Patent Publication No. 2010-0009185.

When the internal memory is used as the buffer, read and write operations can be performed quickly and power consumption is low. However, since the size of HARQ information is fairly large, when the internal memory is used as the buffer, a chip size increases, causing the price of the chip to increase. In addition, when the size of the HARQ buffer needs to be expanded, expansion cannot be supported, decreasing expandability.

When the external memory is used as the buffer, an existing memory module is used together with a modem chip of the terminal, and therefore, the buffer can be easily implemented with almost no additional cost, and a HARQ memory size can easily be expanded. However, when the external memory is used as the buffer, power consumption is greater than when the internal memory is used.

SUMMARY

The present invention has been made to address at least the above problems and disadvantages, and to provide at least the advantages described below. Accordingly, an aspect of the present invention provides a device and method for reducing power consumption and a chip size using both an external memory and an internal memory when processing Hybrid Automatic Repeat reQuest (HARQ) data.

According to an aspect of the present invention, there is provided a device for receiving and processing HARQ burst data. The device includes a combiner configured to receive a first HARQ burst; an internal memory positioned within the device; and a memory selector configured to compare a size of the first HARQ burst with a predetermined threshold, to select the internal memory or an external memory positioned outside the device according to a comparison result, and to store the first HARQ burst in a selected memory.

According to another aspect of the present invention, there is provided a method of receiving and processing HARQ burst data. The method includes receiving a first HARQ burst, comparing a size of the first HARQ burst with a predetermined threshold, selecting an internal memory positioned within a HARQ processor or an external memory positioned outside the HARQ processor according to a comparison result, and storing the first HARQ burst in a selected memory.

According to another aspect of the present invention, there is provided a device for receiving and processing HARQ burst data. The device includes a combiner configured to receive a first HARQ burst, an internal memory positioned within the device, and a memory selector configured to select the internal memory or an external memory positioned outside the device according to a service type of the first HARQ burst and to store the first HARQ burst in a selected memory.

According to another aspect of the present invention, there is provided a wireless communication device including a demodulator configured to demodulate a received signal and generate a demodulated signal; a log likelihood ratio (LLR) demapper configured to remap the demodulated signal to an LLR signal of N bits, where N is a real number of at least 1; a HARQ processing unit configured to receive the LLR signal, to determine whether the LLR signal is a new signal or a retransmitted signal, and to generate a composite signal by combining the LLR signal with a related signal that has been received and previously stored in memory when the LLR signal is the retransmitted signal; and a decoder configured to decode an output signal of the HARQ processing unit.

BRIEF DESCRIPTION OF THE DRAWINGS

The above and other aspects, features and advantages of the present invention will become more apparent by describing in detail embodiments thereof with reference to the attached drawings in which:

FIG. 4 is a diagram of memory divided into a plurality of memory regions for management according to embodiments of the present invention;

DETAILED DESCRIPTION OF EMBODIMENTS OF THE PRESENT INVENTION

Figure 1:
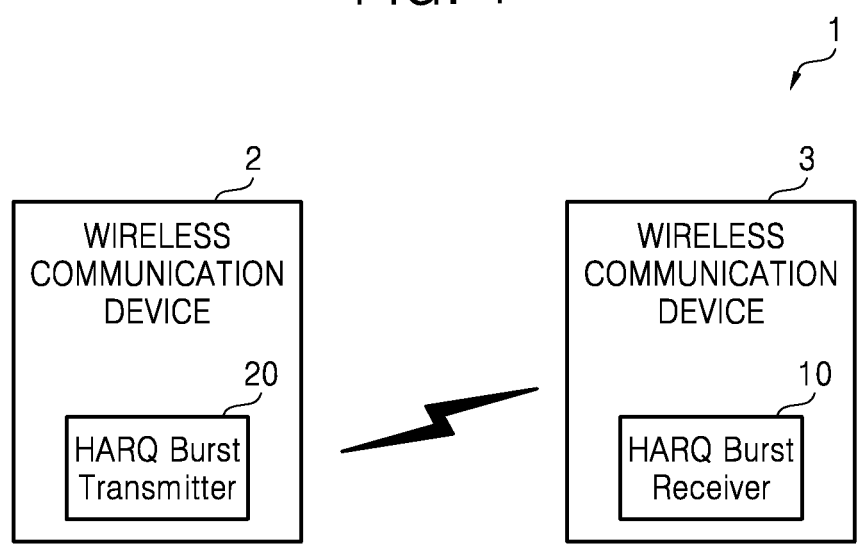
FIG. 1 is a schematic block diagram of a wireless communication system according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this specification will be thorough and complete, and will fully convey the scope of the invention to those skilled in the art. In the drawings, the size and relative sizes of layers and regions may be exaggerated for clarity. Like reference numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be referred to as a second signal, and, similarly, a second signal could be referred to as a first signal without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification, and will not be interpreted in an idealized or overly formal sense unless expressly so defined herein.

FIG. 1 is a schematic block diagram of a wireless communication system 1 according to embodiments of the present invention. The wireless communication system 1 includes a first wireless communication device 2 and a second wireless communication device 3. The wireless communication system 1 may be a mobile communication system using mobile communication standards such as High Speed Packet Access (HSPA) and Long Term Evolution (LTE), but the present invention is not restricted thereto. The first wireless communication device 2 may be a base station and the second wireless communication device 3 may be a mobile communication terminal, but the present invention is not restricted thereto.

A Hybrid Automatic Repeat reQuest (HARQ) burst transmitter 20 included in the first wireless communication device (e.g., a base station) 2 transmits HARQ burst data to the second wireless communication device (e.g., a terminal) 3 through a downlink channel. A HARQ processor (or HARQ burst receiver) 10 included in the second wireless communication device 3 receives the HARQ burst data and transmits an ACK or NACK to the HARQ burst transmitter 20 with respect to the HARQ burst data. The HARQ burst transmitter 20 schedules retransmission of the HARQ burst or transmission of a new HARQ burst based on the ACK or NACK.

According to embodiments of the present invention, the HARQ processor 10 may use a hybrid memory scheme to selectively use an external memory and an internal memory which will be described below. Although not shown, the HARQ processor 10 may be embedded in a network device (e.g., a modem chip).

Figure 2A:
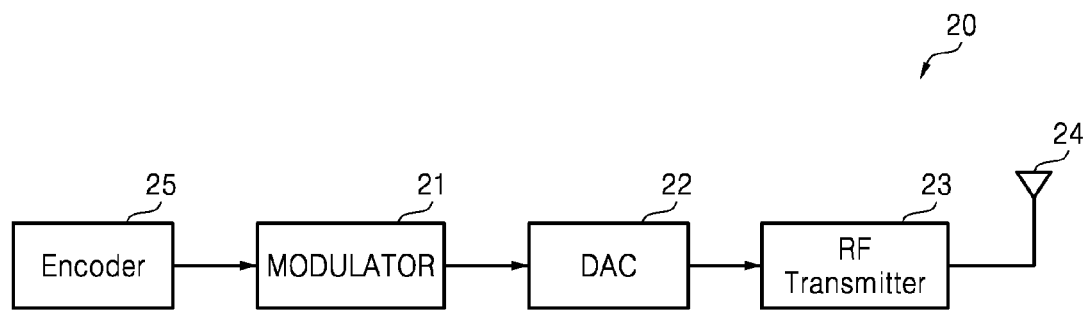
FIG. 2A is a block diagram of a Hybrid Automatic Repeat reQuest (HARQ) burst transmitter illustrated in FIG. 1 according to embodiments of the present invention.

FIG. 2A is a block diagram of the HARQ burst transmitter 20 illustrated in FIG. 1 according to embodiments of the present invention. Referring to FIG. 2A, the HARQ burst transmitter 20 includes an encoder 25, a modulator 21, a digital-to-analog converter (DAC) 22, and a radio frequency (RF) transmitter 23. The encoder 25 performs channel coding on input data for correction of errors occurring in a radio channel. The modulator 21 modulates a channel-coded digital signal output from the encoder 25 according to a predetermined modulation method. For instance, the modulator 21 may map the digital signal to an M-ary quadrature amplitude modulation (M-QAM) (where M is an integer of at least 2, e.g., 16) signal. The DAC 22 converts a digital signal (e.g., a QAM signal) output from the modulator 21 into an analog signal.

The RF transmitter 23 converts the analog signal output from the DAC 22 into an RF signal and transmits the RF signal through an antenna 24. The RF transmitter 23 may perform power amplification and filtering on the RF signal before outputting the RF signal to the antenna 24.

Figure 2B:
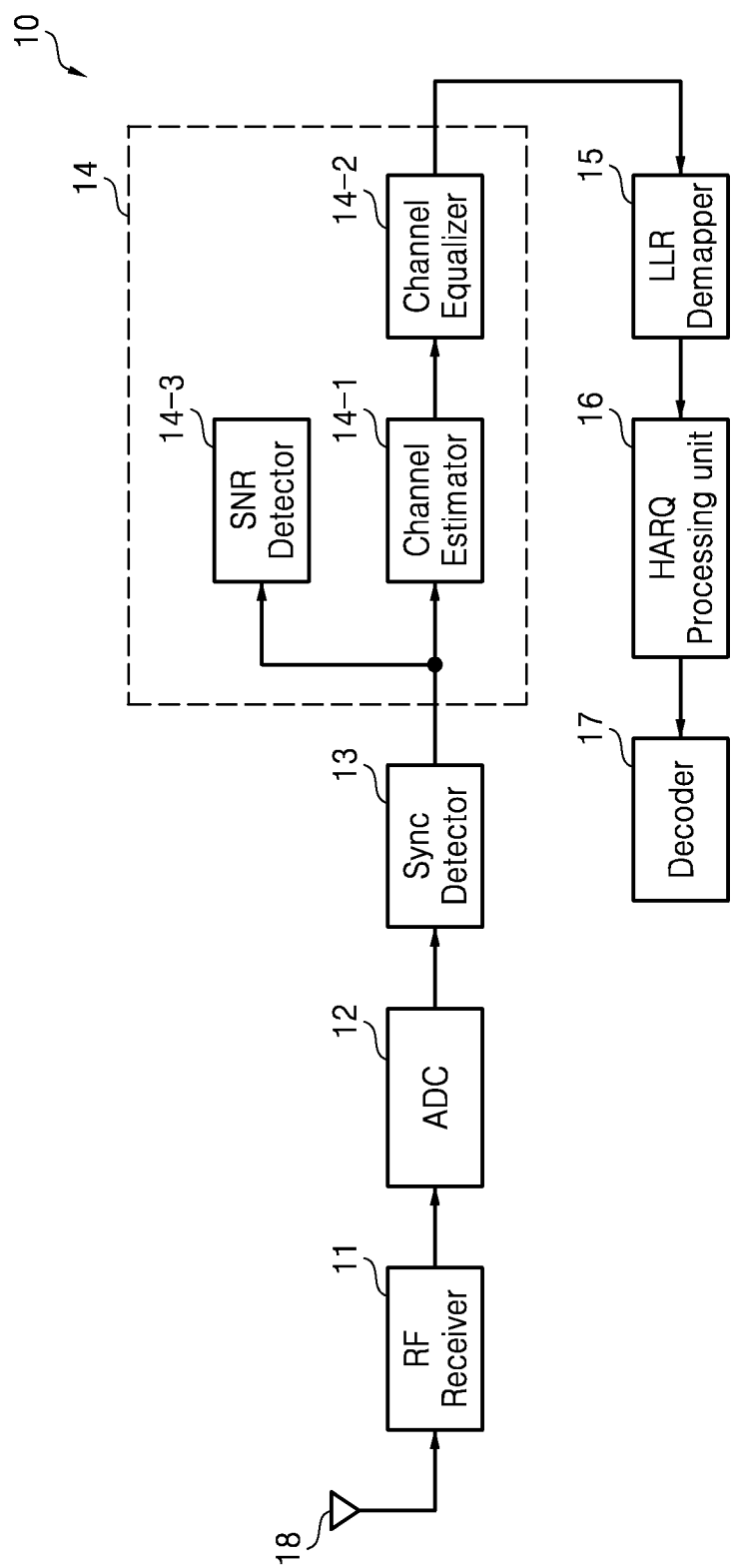
FIG. 2B is a block diagram of a HARQ processor illustrated in FIG. 1 according to embodiments of the present invention.

FIG. 2B is a block diagram of the HARQ processor 10 illustrated in FIG. 1 according to embodiments of the present invention. Referring to FIG. 2B, the HARQ processor 10 includes an RF receiver 11, an analog-to-digital converter (ADC) 12, a sync detector 13, a demodulator 14, a log likelihood ratio (LLR) demapper 15, a HARQ processing unit 16, and a decoder 17. The demodulator 14 may include a channel estimator 14-1, a channel equalizer 14-2, and a signal-to-noise ratio (SNR) detector 14-3.

The RF receiver 11 receives an RF signal through an antenna 18 and converts it into a baseband signal. The RF receiver 11 may perform filtering and low noise amplification (LNA) on the RF signal before converting it into the baseband signal. The ADC 12 converts an output signal of the RF receiver 11 into digital data.

The sync detector 13 detects a sync signal for synchronization of a received signal. The channel estimator 14-1 estimates attenuation or distortion of the signal's amplitude or distortion of the signal's phase, which occur in a channel, and generates a channel estimated signal. The channel equalizer 14-2 compensates the channel using the channel estimated signal output from the channel estimator 14-1, thereby generating a channel-compensated demodulated signal. The demodulated signal output from the channel equalizer 14-2 may be an M-QAM signal. The SNR detector 14-3 detects an SNR or a signal-to-interference plus noise ratio (SINR) of a received signal.

The LLR demapper 15 receives the demodulated signal (e.g., the M-QAM signal) and remaps the demodulated signal to an N-bit LLR soft bit signal (hereinafter, referred to as an LLR signal). In other words, the LLR demapper 15 may calculate an LLR from the demodulated signal and output an N-bit LLR signal (LLR in FIG. 3).

The HARQ processing unit 16 receives the LLR signal and determines whether the LLR signal is new or has been retransmitted. When it is determined that the LLR signal is new, the HARQ processing unit 16 outputs the LLR signal to the decoder 170. When it is determined that the LLR signal has been retransmitted, the HARQ processing unit 16 combines the LLR signal with a related signal that has been received and stored and outputs a composite signal to the decoder 17. The decoder 17 decodes the signal output from the HARQ processing unit 16.

Figure 3:
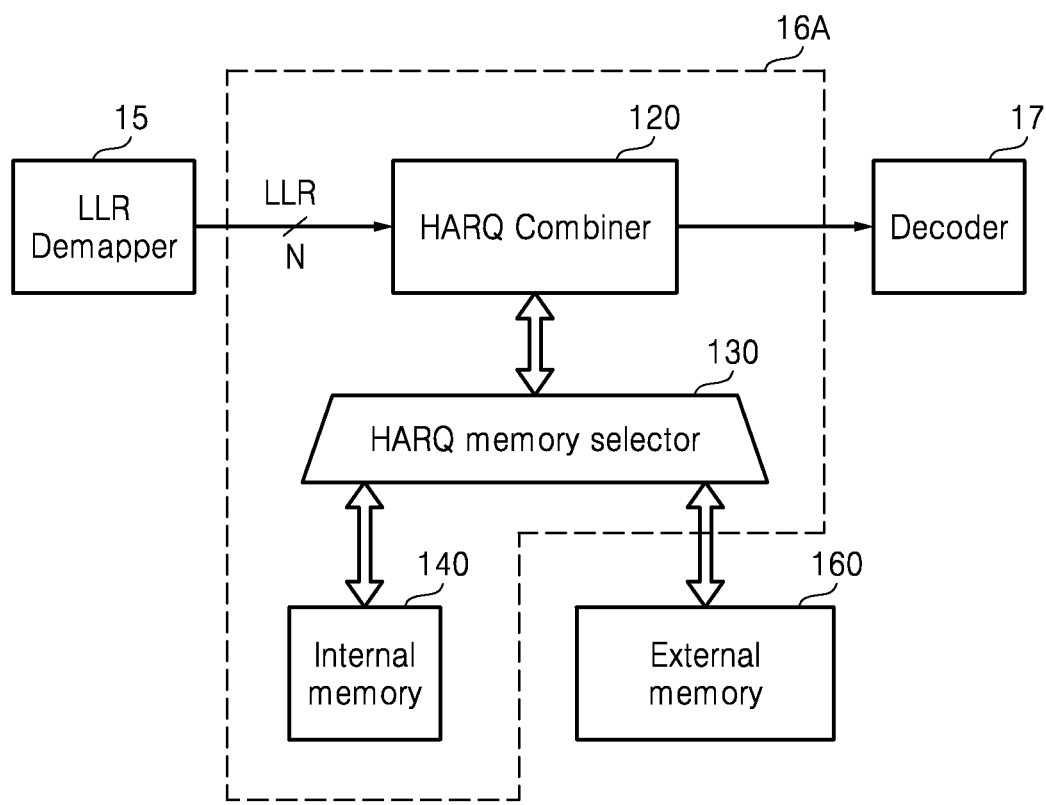
FIG. 3 is a block diagram of a HARQ processing unit according to embodiments of the present invention.

FIG. 3 is a block diagram of a HARQ processing unit 16A according to embodiments of the present invention. The HARQ processing unit 16A includes a HARQ combiner 120, a HARQ memory selector 130, and an internal memory 140.

The combiner 120 receives a HARQ burst represented with N-bit LLR data from the LLR demapper 15.

The memory selector 130 compares the size of the HARQ burst that has been received with a predetermined threshold and determines whether to store the HARQ burst in the internal memory 140 or an external memory 160 according to the comparison result. In detail, the memory selector 130 calculates the size of the HARQ burst, selects the internal memory 140 when the size of the HARQ burst does not exceed the threshold, selects the external memory 160 when the size of the HARQ burst exceeds the threshold, and stores the HARQ burst in one of the selected memory 140 or 160.

The combiner 120 also combines a HARQ signal currently received with a previous HARQ signal that has been received and stored in the memory 140 or 160 to correspond to the current HARQ signal.

The internal memory 140 is embedded in the HARQ processing unit 16A or in a modem including the HARQ processing unit 16A. When the size of a transmission block of a currently received HARQ burst or the size of a composite HARQ signal to be stored does not exceed the threshold, the internal memory 140 may be selected by the memory selector 130 to store the HARQ burst or the composite HARQ signal.

The external memory 160 is provided outside the HARQ processing unit 16A or outside the modem including the HARQ processing unit 16A. When the size of the transmission block of the currently received HARQ burst or the size of a composite HARQ signal to be stored exceeds the threshold, the external memory 160 may be selected by the memory selector 130 to store the HARQ burst or the composite HARQ signal.

The internal memory 140 and the external memory 160 may be divided into a plurality of memory regions. A signal (e.g., an occupied bit) indicating the availability or validity of each memory region may be used. For instance, an occupied bit is set to "1" for a used memory region in which a HARQ burst has been stored to indicate that the memory region is validly used.

FIG. 4 is a diagram of memory divided into a plurality of memory regions for management according to embodiments of the present invention. Referring to FIG. 4, an occupied bit (OB) and a HARQ identifier (ID) (having one of values 1 through 7) are used for each of the memory regions to manage the use state of each memory region.

When a memory region is being used, that is, an LLR signal is effectively stored in the memory region, the OB of the memory region may be set to "1" to indicate that the memory region is being used. In addition, a HARQ ID of the LLR signal stored in the memory region may be stored with respect to the memory region. FIG. 4 illustrates that the LLR signal corresponding to HARQ ID '0' is stored in the memory regions of memory region IDs 1, 2 and 3 and the LLR signal corresponding to HARQ ID '2' is stored in the memory regions of memory region IDs 5 and 6.

Meanwhile, when the memory region is no longer used, the OB of the memory region may be set to "0" to indicate that the memory region is available.

A HARQ burst stored in the internal memory 140 or the external memory 160 may be combined with a retransmitted HARQ burst.

Figure 5:
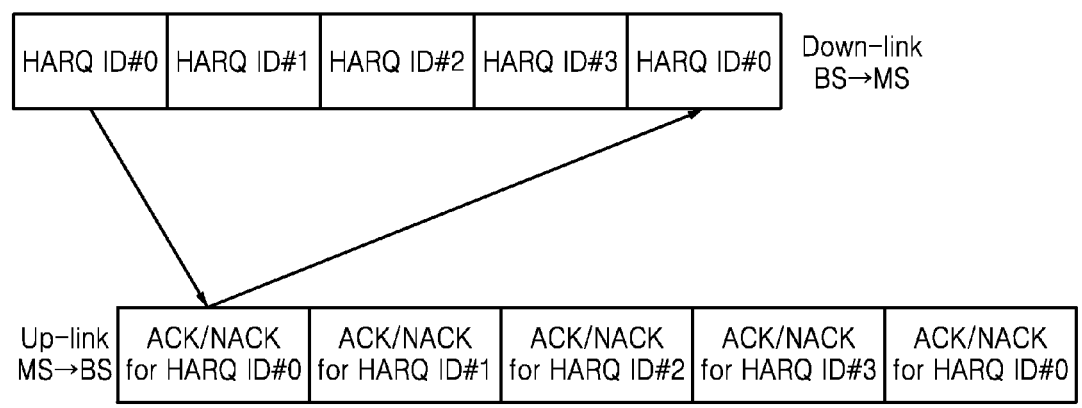
FIG. 5 is a diagram for explaining a method of transmitting a HARQ burst.

FIG. 5 is a diagram for explaining a method of transmitting a HARQ burst. Referring to FIGS. 1 through 5, the HARQ burst transmitter 20 (FIG. 1) transmits HARQ burst data to the HARQ burst receiver, i.e., HARQ processor 10 using a plurality of (i.e., at least two) HARQ channels. The plurality of HARQ channels are identified by a HARQ ID as shown in FIG. 5.

When receiving a HARQ burst through a HARQ channel, the HARQ processor 10 transmits an ACK/NACK to the HARQ burst transmitter 20 with respect to the received HARQ burst. The HARQ burst transmitter 20 schedules retransmission of the old HARQ burst or transmission of a new HARQ burst based on the ACK/NACK received from the HARQ processor 10.

FIG. 5 illustrates the concept of transmitting an HARQ burst using four HARQ IDs. The present invention is not restricted to the current embodiment and the number of HARQ IDs may be changed.

The combiner 120 determines whether a received signal is a new signal or a retransmitted signal based on its HARQ ID (or a HARQ channel ID), reads a signal corresponding to the HARQ ID from the internal memory 140 or the external memory 160 when it is determined that the received signal is the retransmitted signal, and combines the received signal with the signal read from the memory 140 or 160 to generate a composite signal.

The memory selector 130 compares the size of the composite signal to a threshold, selects one of the internal memory 140 and the external memory 160 according to the comparison result, and stores the composite signal in the selected memory 140 or 160.

The received signal or the composite signal is transmitted from the combiner 120 to the decoder 17 and is decoded by the decoder 17. When the decoding result is normal (i.e., the Cyclic Redundancy Check (CRC) is good) in the decoder 17, that is, when there is no error, the received signal or the composite signal is erased or flushed from the memory 140 or 160. In an otherwise case (i.e., the CRC is bad), the received signal or the composite signal is retained in the memory 140 or 160 so that it can be used for the next combining. When there is no error in the decoding result of the decoder 17, for instance, an OB for a memory region in which the HARQ burst has been stored is set to "0" to indicate that the memory region has been flushed.

Figure 6:
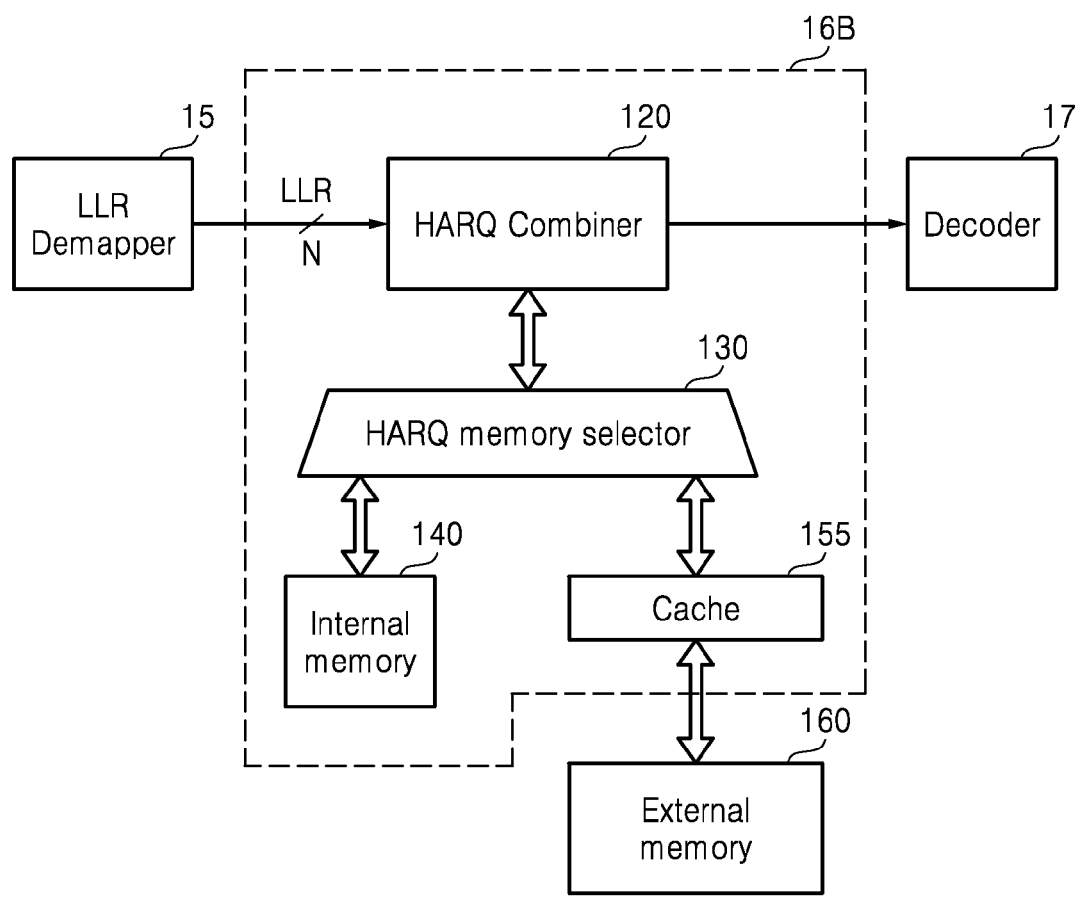
FIG. 6 is a block diagram of a HARQ processing unit according to embodiments of the present invention.

FIG. 6 is a block diagram of a HARQ processing unit 16B according to embodiments of the present invention. The HARQ processing unit 16B further includes an internal cache 155 as compared to the HARQ processing unit 16A illustrated in FIG. 3.

The cache 155 is connected between the memory selector 130 and the external memory 160 and functions as a buffer between the HARQ processing unit 16B and the external memory 160. The cache 155 temporarily stores data that will be stored or have been stored in the external memory 160. The cache 155 may be implemented using a Static Random Access Memory (SRAM).

According to embodiments of the present invention, characteristics of a service type used by a wireless communication device (e.g., a terminal) may be analyzed and the threshold described above and the size of the internal memory 140 may be determined based on the characteristics.

In some embodiments, a first service type is defined to indicate services that are used frequently but require a small transmission block size due to a low throughput. For instance, a Voice over Internet Protocol (VoIP) (e.g., Voice over Long Term Evolution (VoLTE)) service, a messenger service, a Social Network Service (SNS), a web browsing service, an on-line game service, and a low speed streaming service may be the first service type. For a HARQ burst transmitted in the first service type, the internal memory 140 is used as a HARQ memory when the internal memory 140 has available space. Accordingly, as compared to a case using the external memory 160 as the HARQ memory, an operation can be performed with low power. Contrarily, services, such as data download and video streaming, that require a large transmission block size due to a high throughput may be defined as a second service type. For a HARQ burst corresponding to the second service type, the external memory 160 is used as the HARQ memory.

In other embodiments of the present invention, the first service type may indicate cases where the characteristic (e.g., average, variance, or a combination thereof) of received transmission block sizes or HARQ burst sizes satisfies a predetermined condition (e.g., does not exceed a predetermined threshold). For instance, the first service type may be defined based on the characteristic of a transmission block size or a HARQ burst size, the characteristic of the size of a received transmission block or HARQ burst may be calculated, the received HARQ burst is stored in the internal memory 140 when the received HARQ burst corresponds to the first service type, and the received HARQ burst is stored in the external memory 160 when the received HARQ burst does not correspond to the first service type.

In one instance, a case where an average transmission block size does not exceed a predetermined threshold may be classified as the first service type and a case where the average transmission block size exceeds the threshold may be classified as the second service type. In another instance, a case where an average HARQ burst size does not exceed a predetermined threshold may be classified as the first service type and a case where the average HARQ burst size exceeds the threshold may be classified as the second service type.

Figure 7:
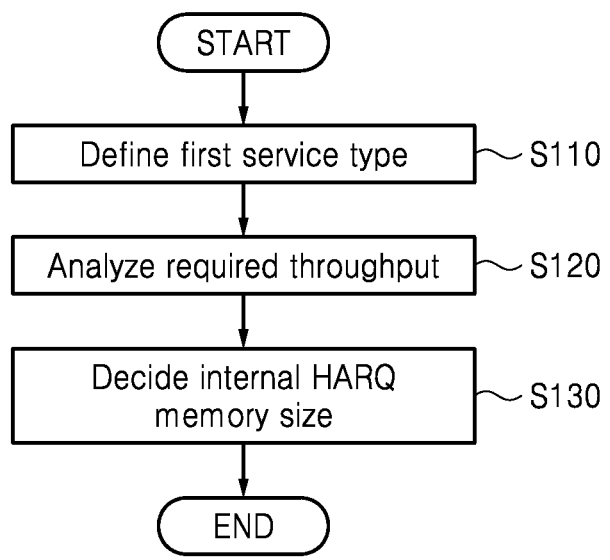
FIG. 7 is a flowchart of a method of deciding an internal memory size according to embodiments of the present invention.

FIG. 7 is a flowchart of a method of deciding an internal memory size according to embodiments of the present invention. Referring to FIG. 7, a first service type is defined in step S110. As described above, the first service type may be defined as a set of particular services or may be defined based on the characteristic of a transmission block or a HARQ burst.

Thereafter, a throughput required for the services of the first service type is analyzed in step S120. The throughput may be the amount of data received or processed per unit time in the HARQ processor 10. A transmission block size of the first service type is determined according to the analyzed throughput and the required size of the internal memory 140 is determined based on the transmission block size in step S130.

In other words, the internal memory size that can accommodate the throughput of the first service type is determined in step S130. A threshold may also be determined according to the internal memory size in step S130.

Figure 8:
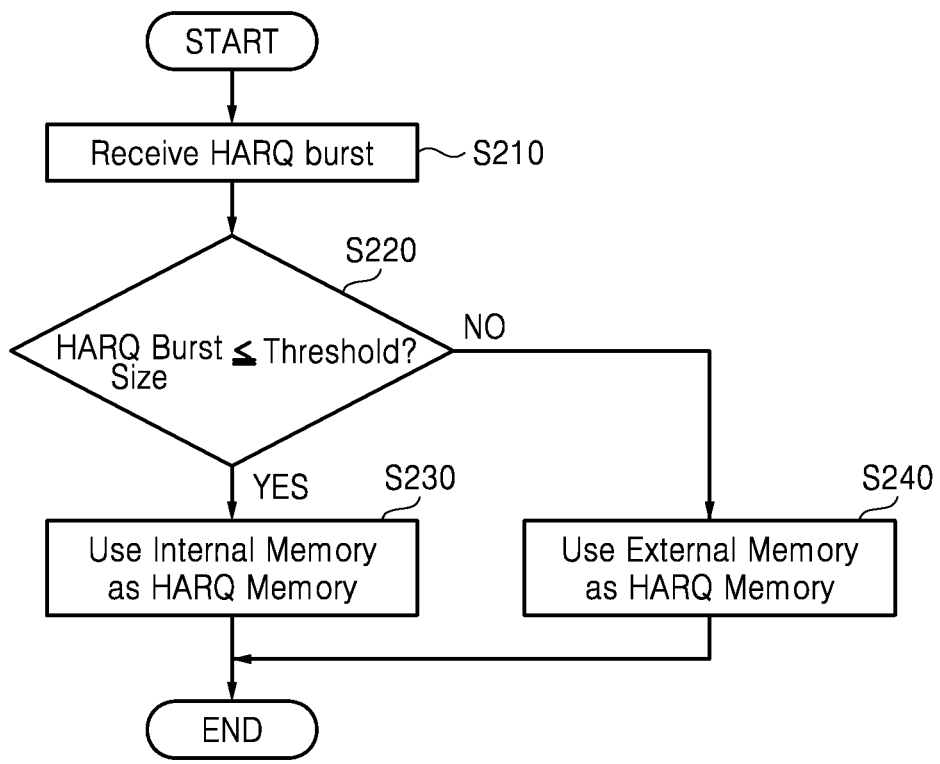
FIG. 8 is a flowchart of a method of processing HARQ data according to embodiments of the present invention.

FIG. 8 is a flowchart of a method of processing HARQ data according to embodiments of the present invention. When a HARQ burst is received in step S210, the size of the HARQ burst is compared with a threshold in step S220. When the size of the HARQ burst is less than or equal to the threshold, the internal memory 140 is used as an HARQ memory in step S230. When the size of the HARQ burst is greater than the threshold, the external memory 160 is used as the HARQ memory in step S240.

When a received signal is not a new signal but a retransmitted signal, the size of a signal obtained by combining the received signal with a related signal stored in the memory 140 or 160 may be compared with the threshold to select one of the memory 140 or 160, and the combined signal may be stored in the selected memory.

Figure 9:
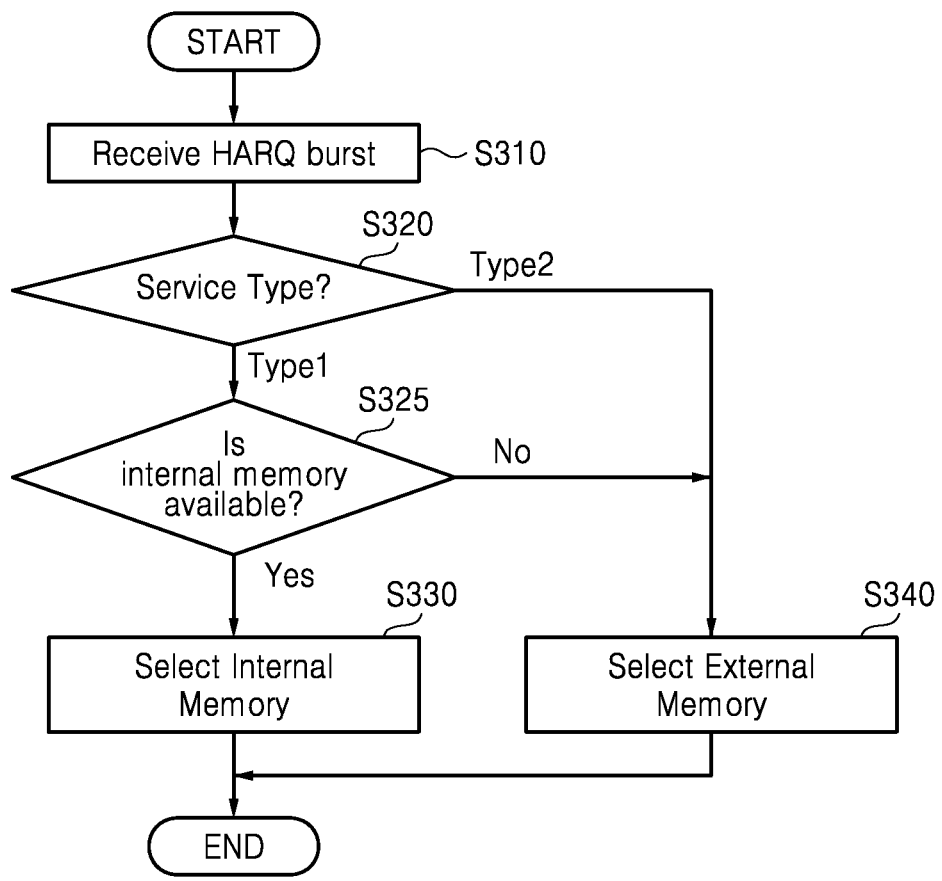
FIG. 9 is a flowchart of a method of processing HARQ data according to embodiments of the present invention.

FIG. 9 is a flowchart of a method of processing HARQ data according to embodiments of the present invention. Referring to FIG. 9, a HARQ burst is received in step S310 and the received HARQ burst is checked for a service type in step S320. It is determined whether the internal memory 140 is available for the HARQ burst in step S325.

According to the service type of the HARQ burst and the availability of the internal memory 140, either the internal memory 140 or the external memory 160 may be selected. For instance, when the service type of the HARQ burst is the first service type (type 1) and the internal memory 140 has available space, the memory selector 130 selects the internal memory 140 in step S330. When the service type of the HARQ burst is the second service type (type 2) and the internal memory 140 is not available, the memory selector 130 selects the external memory 160 in step S340.

The service type may be decided by a service type signal (not shown) externally input to the HARQ processor 10. For instance, a processor (e.g., 505 in FIG. 10) outside the HARQ processor 10 may output the service type signal, which indicates a service type executed by the wireless communication device 3, to the HARQ processor 10. Then, the HARQ processor 10 may select the memory 140 or 160 according to the service type signal.

Figure 10:
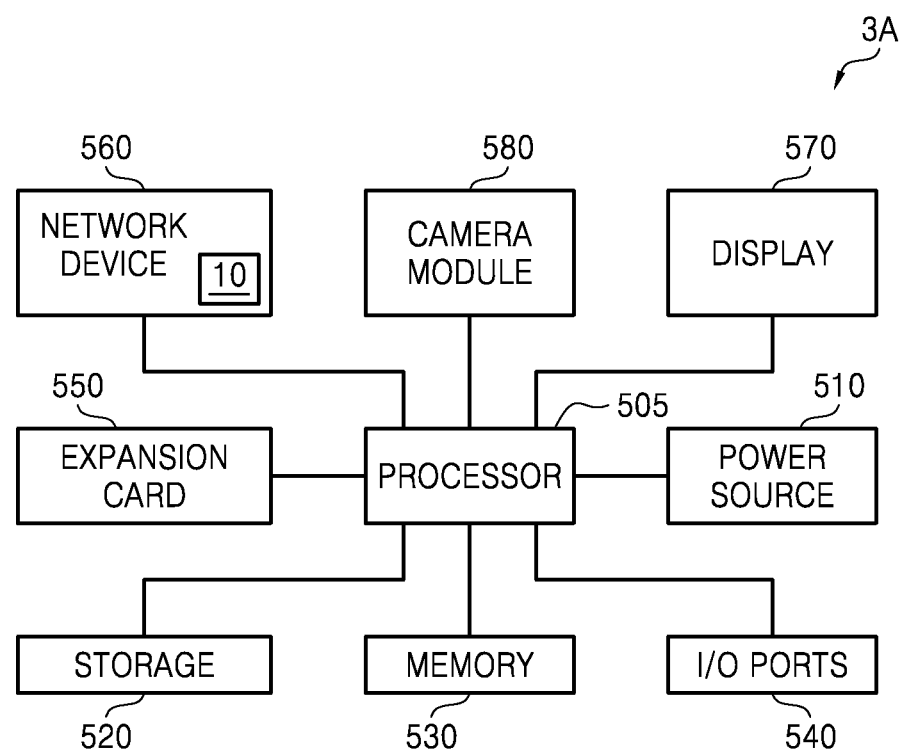
FIG. 10 is a block diagram of a wireless communication device including a HARQ processor according to embodiments of the present invention.

FIG. 10 is a block diagram of a wireless communication device 3A including the HARQ processor 10 according to embodiments of the present invention. Referring to FIG. 10, the wireless communication device 3A may be implemented as a laptop computer, a cellular phone, a smart phone, a Tablet Personal Computer (PC), a Personal Digital Assistant (PDA), an Enterprise Digital Assistant (EDA), a digital still camera, a digital video camera, a Portable Multimedia Player (PMP), a Personal Navigation Device or Portable Navigation Device (PND), a handheld game console, or an e-book.

The wireless communication device 3A includes a processor 505, a power source 510, a storage 520, a memory 530, an input/output (I/O) port 540, an expansion card 550, a network device 560, and a display 570. The wireless communication device 3A may also include a camera module 580.

The processor 505 controls the operation of at least one of the elements 510 through 580. The processor 505 may be implemented as a multi-core processor. The multi-core processor is a single computing component with two or more independent actual processors (referred to as cores). Each of the processors may read and execute program instructions. The multi-core processor can drive a plurality of accelerators at a time, and therefore, the wireless communication device 3A including the multi-core processor may perform multi-acceleration.

The power source 510 supplies an operating voltage to at least one of the elements 505 and 520 through 580. The storage 520 may be implemented as a hard disk drive (HDD) or a solid state drive (SSD).

The memory 530 may be implemented by a volatile or non-volatile memory. According to embodiments of the present invention, a memory controller (not shown) that controls a data access operation, e.g., a read operation, a write operation (or a program operation), or an erase operation, on the memory 530 may be integrated into or embedded in the processor 505. The memory controller may also be provided between the processor 505 and the memory 530.

The I/O port 540 receives data transmitted to the wireless communication device 3A or transmits data from the wireless communication device 3A to an external device. For instance, the I/O port 540 may be a port for connection with a pointing device such as a computer mouse, a port for connection with a printer, or a port for connection with a Universal Serial Bus (USB) drive.

The expansion card 550 may be implemented as a secure digital (SD) card or a multimedia card (MMC). The expansion card 550 may be a Subscriber Identity Module (SIM) card or a Universal SIM (USIM) card.

The network device 560 enables the wireless communication device 3A to be connected with a wired or wireless network and may be referred to as a modem or a modem chip. The network device 560 may include the HARQ processor 10 described above according to embodiments of the present invention.

The display 570 displays data output from the storage 520, the memory 530, the I/O port 540, the expansion card 550, or the network device 560. The camera module 580 is a module that can convert an optical image into an electrical image. Accordingly, the electrical image output from the camera module 580 may be stored in the storage 520, the memory 530, or the expansion card 550. In addition, the electrical image output from the camera module 580 may be displayed through the display 570.

As described above, according to embodiments of the present invention, an external memory is used to reduce the size of a modem chip including a HARQ processor and an internal memory is used for a service requiring a low-power operation to reduce power consumption. Since the external memory is used as a HARQ memory, the size of the modem chip is reduced. In addition, since the service requiring the low-power operation has a low throughput, when the internal memory is used as the HARQ memory for this service, power consumption is decreased as compared to when the external memory is used.

While the present invention has been particularly shown and described with reference to certain embodiments thereof, it will be understood by those of ordinary skill in the art that various changes in forms and details may be made therein without departing from the spirit and scope of the present invention as defined by the following claims and their equivalents.

What is claimed is:

1. A device for receiving and processing Hybrid Automatic Repeat reQuest (HARQ) burst data, the device comprising:
   a HARQ processor comprising:
      a combiner configured to receive a first HARQ burst;
      an internal memory positioned within the HARQ processor; and
      a memory selector configured to compare a size of the first HARQ burst with a predetermined threshold to generate a first comparison result, to select the internal memory as a first selected memory when the size of the first HARQ burst does not exceed the threshold, to select an external memory positioned outside the HARQ processor as the first selected memory when the size of the first HARQ burst exceeds the threshold, and to store the first HARQ burst in the first selected memory,
   wherein at least one among a size of the internal memory and the threshold is determined based on a characteristic of a service type that has been predetermined.

2. The device of claim 1, further comprising a decoder configured to decode the first HARQ burst, wherein when there is no error in a decoding result, the first HARQ burst stored in one of the internal memory and the external memory is erased or flushed from the memory.

3. The device of claim 2, wherein when there is an error in a result of decoding the first HARQ burst, the combiner receives a second HARQ burst related to the first HARQ burst and generates a first composite signal by combining the second HARQ burst with the first HARQ burst read from one of the internal memory and the external memory; and
   wherein the memory selector compares a size of the first composite signal with the threshold to generate a second comparison result, selects one of the internal memory and the external memory as a second selected memory according to the second comparison result, and stores the first composite signal in the second selected memory.

4. The device of claim 1, further comprising a cache configured to be connected with the external memory and to temporarily store data that will be stored in or has been stored in the external memory.

5. The device of claim 1, wherein the characteristic of the service type is one selected from the group consisting of an average of transmission block sizes or HARQ burst sizes, a variance thereof, and a combination of the average and the variance.

6. The device of claim 1, wherein the service type comprises at least one among a Voice over Long Term Evolution (VoLTE) service, a messenger service, a Social Network Service (SNS), a web browsing service, an on-line game service, and a low speed streaming service.

7. A method of receiving and processing Hybrid Automatic Repeat reQuest (HARQ) burst data in a communication device, which comprises a HARQ processor and an external memory, the method comprising:
   receiving, by the HARQ processor, a first HARQ burst;
   comparing, by the HARQ processor, a size of the first HARQ burst with a predetermined threshold to generate a first comparison result;
   selecting, by the HARQ processor, an internal memory positioned within the HARQ processor as a first selected memory, when the size of the first HARQ burst does not exceed the threshold;

selecting, by the HARQ processor, the external memory positioned outside the HARQ processor as the first selected memory, when the size of the first HARQ burst exceeds the threshold; and storing, by the HARQ processor, the first HARQ burst in the first selected memory, wherein at least one among a size of the internal memory and the threshold is determined based on a characteristic of a service type that has been predetermined.

8. The method of claim 7, further comprising:

decoding the first HARQ burst; and erasing or flushing the first HARQ burst stored in the first selected memory when there is no error in a decoding result.

9. The method of claim 8, further comprising:

informing a HARQ burst transmitter of occurrence of an error when there is an error in the decoding result;

receiving a second HARQ burst related to the first HARQ burst from the HARQ burst transmitter;

generating a first composite signal by combining the second HARQ burst with the first HARQ burst read from one of the internal memory and the external memory; and comparing a size of the first composite signal with the threshold to generate a second comparison result, selecting one of the internal memory and the external memory as a second selected memory according to the second comparison result, and storing the first composite signal in the second selected memory.

10. The method of claim 7, wherein the characteristic of the service type is one selected from the group consisting of an average of transmission block sizes or HARQ burst sizes, a variance thereof, and a combination of the average and the variance.

11. The method of claim 7, wherein the service type comprises at least one among a Voice over Long Term Evolution (VoLTE) service, a messenger service, a Social Network Service (SNS), a web browsing service, an on-line game service, and a low speed streaming service.

12. A device for receiving and processing Hybrid Automatic Repeat reQuest (HARQ) burst data, the device comprising:

a HARQ processor comprising:

a combiner configured to receive a first HARQ burst;

an internal memory positioned within the HARQ processor; and a memory selector configured to select the internal memory when a service type of the first HARQ burst is a first service type and the internal memory has available space, to select an external memory positioned outside the HARQ processor when the service type is a second service type, different from the first service type, or when the internal memory has no available space, and to store the first HARQ burst in a selected memory.

13. The device of claim 12, wherein the service type is determined by a service type signal externally input to the device.

14. The device of claim 12, wherein the service type is determined by a characteristic of a transmission block size or HARQ burst size.

15. A wireless communication device comprising:

a demodulator configured to demodulate a received signal and generate a demodulated signal;

a log likelihood ratio (LLR) demapper configured to remap the demodulated signal to an LLR signal of N bits, where N is a real number of at least 1;

a Hybrid Automatic Repeat reQuest (HARQ) processor configured to receive the LLR signal, to determine whether the LLR signal is a new signal or a retransmitted signal, and to generate a composite signal by combining the LLR signal with a related signal that has been received and previously stored in a first memory when the LLR signal is the retransmitted signal; and a decoder configured to decode the composite signal of the HARQ processor, wherein the HARQ processor is further configured to select the first memory when a service type of the LLR signal is a first service type and when the first memory has available space, and the HARQ processor selects a second memory when the service type is a second service type, different from the first service type, or when the first memory has no available space.

16. The wireless communication device of claim 15, wherein the first memory is an internal memory positioned within the HARQ processor and the second memory is an external memory positioned outside the HARQ processor.

17. The wireless communication device of claim 16, wherein the service type is determined based on a transmission block size or a HARQ burst size.

18. The wireless communication device of claim 16, wherein the demodulated signal is an M-ary Quadrature Amplitude Modulation (M-QAM) signal, where M is a real number of at least 2.

* * * * *